(12) United States Patent
Tinsley, III et al.

(10) Patent No.: US 11,668,423 B2
(45) Date of Patent: *Jun. 6, 2023

(54) QUICK CONNECTOR WITH A REPLACEABLE RESTRICTION ORIFICE

(71) Applicant: DAYCO IP HOLDINGS, LLC, Roseville, MI (US)

(72) Inventors: Donald P. Tinsley, III, Huntington Woods, MI (US); Kevin W. Lucka, Southfield, MI (US); David E. Fletcher, Davison, MI (US); Matthew C. Gilmer, South Lyon, MI (US)

(73) Assignee: Dayco IP Holdings, LLC, Roseville, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/807,156

(22) Filed: Jun. 16, 2022

(65) Prior Publication Data

US 2022/0307637 A1     Sep. 29, 2022

Related U.S. Application Data

(63) Continuation of application No. 17/065,638, filed on Oct. 8, 2020, now Pat. No. 11,378,211.

(51) Int. Cl.
*F16L 37/12* (2006.01)
*B60K 15/04* (2006.01)
*F02M 25/08* (2006.01)
*F15D 1/02* (2006.01)

(52) U.S. Cl.
CPC .......... *F16L 37/1225* (2013.01); *B60K 15/04* (2013.01); *F02M 25/08* (2013.01); *F15D 1/025* (2013.01)

(58) Field of Classification Search
CPC ..... F16L 37/1225; B60K 15/04; F02M 25/08; F15D 1/025
USPC ........................................ 123/519
See application file for complete search history.

(56) References Cited

U.S. PATENT DOCUMENTS

| | | | | |
|---|---|---|---|---|
| 5,275,443 | A * | 1/1994 | Klinger | F16L 37/0985 285/305 |
| 8,113,547 | B2 * | 2/2012 | Andre | F16L 37/144 285/310 |
| 11,378,211 | B2 * | 7/2022 | Tinsley, III | B60K 15/035 |
| 2011/0271515 | A1 * | 11/2011 | Poder | F16L 37/0841 285/403 |

* cited by examiner

*Primary Examiner* — Mahmoud Gimie
(74) *Attorney, Agent, or Firm* — FisherBroyles, LLP; Susan M. Oiler

(57) ABSTRACT

Female quick couplings have a housing defining an axial bore therethrough that has a frustum-shaped bore portion that defines a restriction orifice, a first slot transverse to the axial bore, an a first shoulder between the first slot and the restriction orifice, and a locking member slidingly received in the first slot. The frustum-shaped bore can have an upstream conical frustum and a downstream conical frustum mated at their respective smaller diameter. The upstream conical frustum has a largest diameter that is larger than a largest diameter of the downstream conical frustum. Engine systems incorporating the female quick coupling and female quick coupling kits are also disclosed.

13 Claims, 7 Drawing Sheets

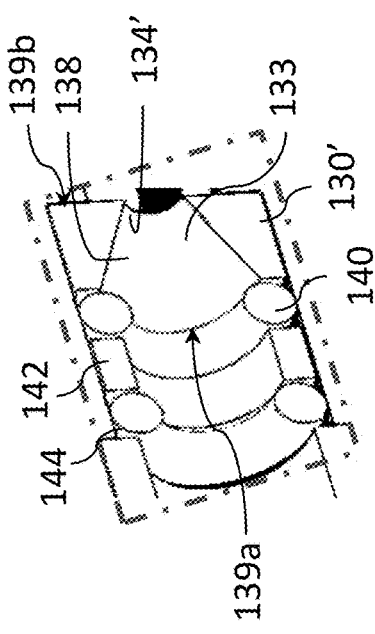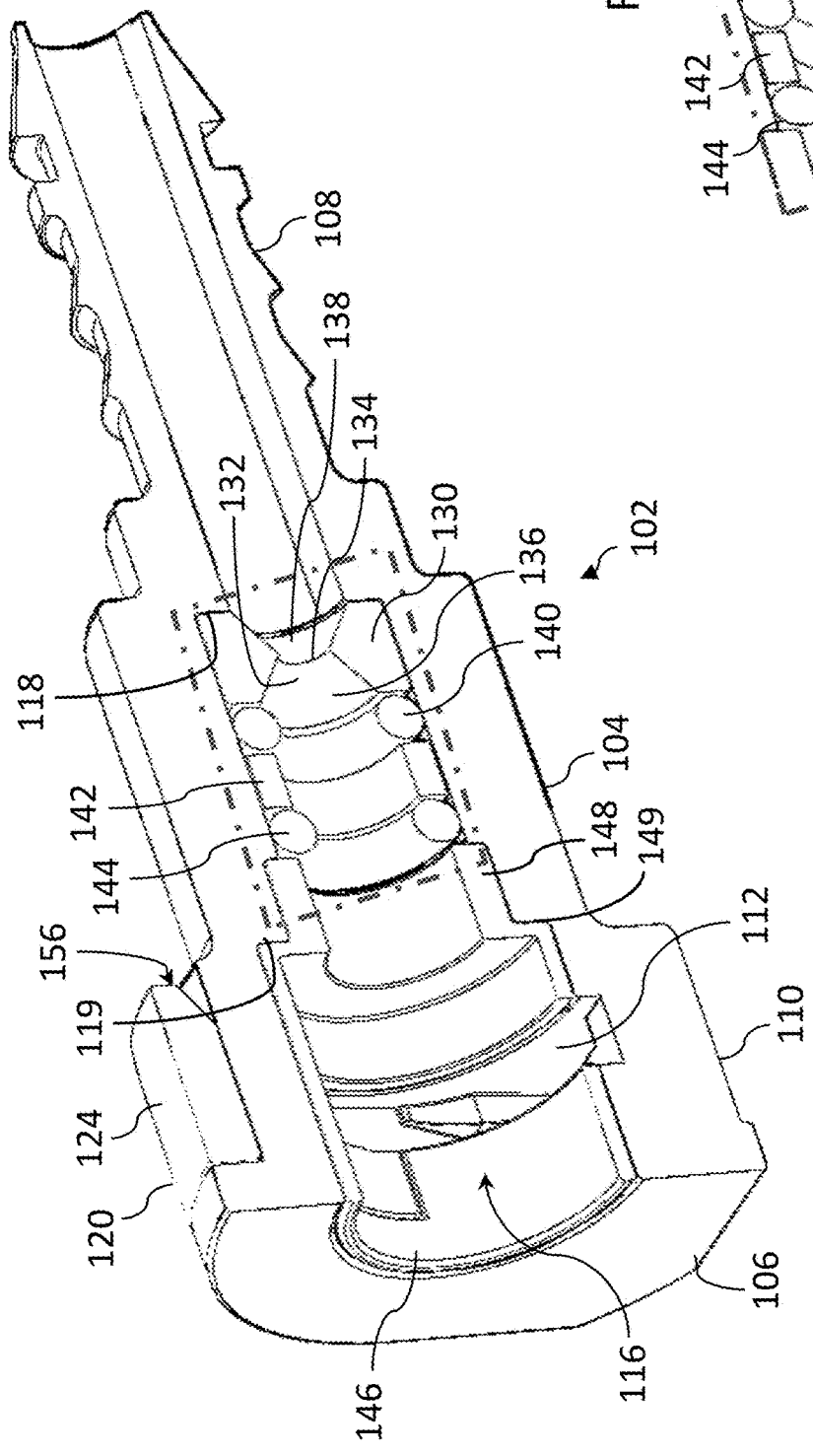

QUICK CONNECTOR WITH A REPLACEABLE RESTRICTION ORIFICE

RELATED APPLICATIONS

This application is a continuation of U.S. application Ser. No. 17/065,638, filed Oct. 8, 2020, which claims the benefit of U.S. Provisional Application No. 62/912,154, filed Oct. 18, 2019, the entirety of which is incorporated herein by reference.

TECHNICAL FIELD

This application relates to fuel vapor purge systems, more particularly, to a quick connector meeting SAE J2044 requirements and having a replaceable or tunable restriction orifice for use in such systems.

BACKGROUND

Fuel vapor emission or purge control systems are implemented in internal combustion engine systems to comply with environmental and safety regulations. These systems prevent fuel vapor from escaping to the atmosphere, for example, by venting fuel vapors to a purge canister which contains activated carbon. Under preselected engine conditions, a purge valve opens and vacuum from the intake manifold draws the vapor to the engine's combustion chamber to be burned as part of the aggregate fuel-air mixture.

Another requirement of such systems is a leak-detection system. Various leak detections systems have been implemented, for example, the systems in U.S. Pat. No. 9,840,985. However, the presence of multiple quick connectors provides multiple opportunities for leaks.

In the prior art system 10 illustrated in FIG. 1, between the fuel filler inlet 12 and the fuel tank 14 there are two quick connectors 16 and a vapor "T" fitting with a restriction orifice 18. The vapor "T" connects the fuel filler inlet 12, the fuel tank 14, and the fuel line 20. This configuration provides at least five potential leak paths. The fuel line 20 leads to a fuel vapor canister 22 and then to the engine. The conduit between the fuel vapor canister 22 and the engine may be referred to as a purge line 24.

There is a need to protect fuel systems from potential leak paths, in particular by reducing the number of potential leak paths while providing a compact device that is tunable, especially during the testing phase of development without a system or component part rebuild.

SUMMARY

In all aspects, female quick couplings are disclosed that have a housing defining an axial bore having a first shoulder and a first slot transverse to the axial bore, a removable insert defining a restriction orifice seated against the first shoulder within the axial bore, and a locking member slidingly received in the first receptacle. The removable insert defines a restriction orifice having an upstream conical frustum and a downstream conical frustum mated at their respective smaller diameter. The upstream conical frustum has a largest diameter substantially similar to an internal diameter of the first sealing member and the downstream conical frustum has a largest diameter substantially similar to an internal diameter of the axial bore extending downstream of the first shoulder. The largest dimeter of the upstream conical frustum is larger than the largest diameter of the downstream conical frustum. The upstream conical frustum and the downstream conical frustum can be shaped according to a hyperbolic function.

In an example embodiment, the female quick coupling has, in order, seated upon the removable insert, a first sealing member, a spacer, a second sealing member, and a lock washer. The axial bore has a dual stepped bore defining the first shoulder and a second shoulder, and the lock washer is seated against the second shoulder.

In all aspects, the removable insert defines a frustoconically-shaped bore defining the restriction orifice, wherein the removable insert is seatable against the first shoulder of the axial bore with either of a first end face defining the restriction orifice or a second end face defining the opening of the frustoconically-shaped bore is seated against the first shoulder. The removable insert is dimensioned to be inserted into the axial bore from the input end.

In all aspects, the housing defines a second receptable transverse to the axial bore and positioned proximate the first shoulder, and the removable insert is a latchable plug defining the restriction orifice slidingly received in the second receptable with the restriction orifice aligned with the axial bore.

In another aspect, a female quick coupling kit is disclosed that has a housing defining an axial bore having a first shoulder and a latching slot transverse to the axial bore, a plurality of removable inserts each defining a restriction orifice of a different dimension, a locking member slidingly receivable in the latching slot to lock a male fluid line in the axial bore of the housing. Each of the plurality of removable inserts is seatable against the first shoulder within the axial bore;

In an example embodiment, the female quick coupling has, in order, seated upon the removable insert, a first sealing member, a spacer, a second sealing member, and a lock washer. The axial bore has a dual stepped bore defining the first shoulder and a second shoulder, and the lock washer is seated against the second shoulder.

In all aspects, the removable insert is dimensioned to be inserted into the axial bore from the input end. The housing defines a second receptable transverse to the axial bore and positioned proximate the first shoulder, and the removable insert is a latchable plug defining the restriction orifice slidingly received in the second receptable with the restriction orifice seated on the first shoulder. At least one of the plurality of inserts defines a frustoconically-shaped orifice that is seatable against the first shoulder of the axial bore with either of a first end face or a second end face seated against the first shoulder or at least one of the plurality of inserts defines a restriction orifice having two conical frustums mated at their respective smaller diameter.

In another aspect, a female quick coupling kit is disclosed that has a plurality of housings each defining an axial bore defining a restriction orifice and a latching slot transverse to the axial bore, a locking member slidingly receivable in the latching slot of each of the plurality of housings to lock a male fluid line in the axial bore of the housing. The female quick coupling can have, in order, seated juxtaposed to the restriction orifice, a first sealing member, a spacer, a second sealing member, and a lock washer. Here, each of the plurality of housings are molded to include the restriction orifice.

In another aspect, fuel vapor purge systems are disclosed that have a fuel tank in fluid communication with a fuel filler inlet, a purge canister and an internal combustion engine, and any of the female quick coupling disclosed herein in the fuel line between the fuel filler inlet and the fuel tank. The system can have a purge cannister in fluid communication with the fuel tank.

BRIEF DESCRIPTION OF THE DRAWINGS

FIG. 4 is an assembled, longitudinal cross-sectional view of the female quick coupling of FIG. 3.

FIG. 5 is an alternate embodiment of a replaceable restriction orifice for the female quick coupling of FIGS. 3 and 4.

DETAILED DESCRIPTION

Figure 1:
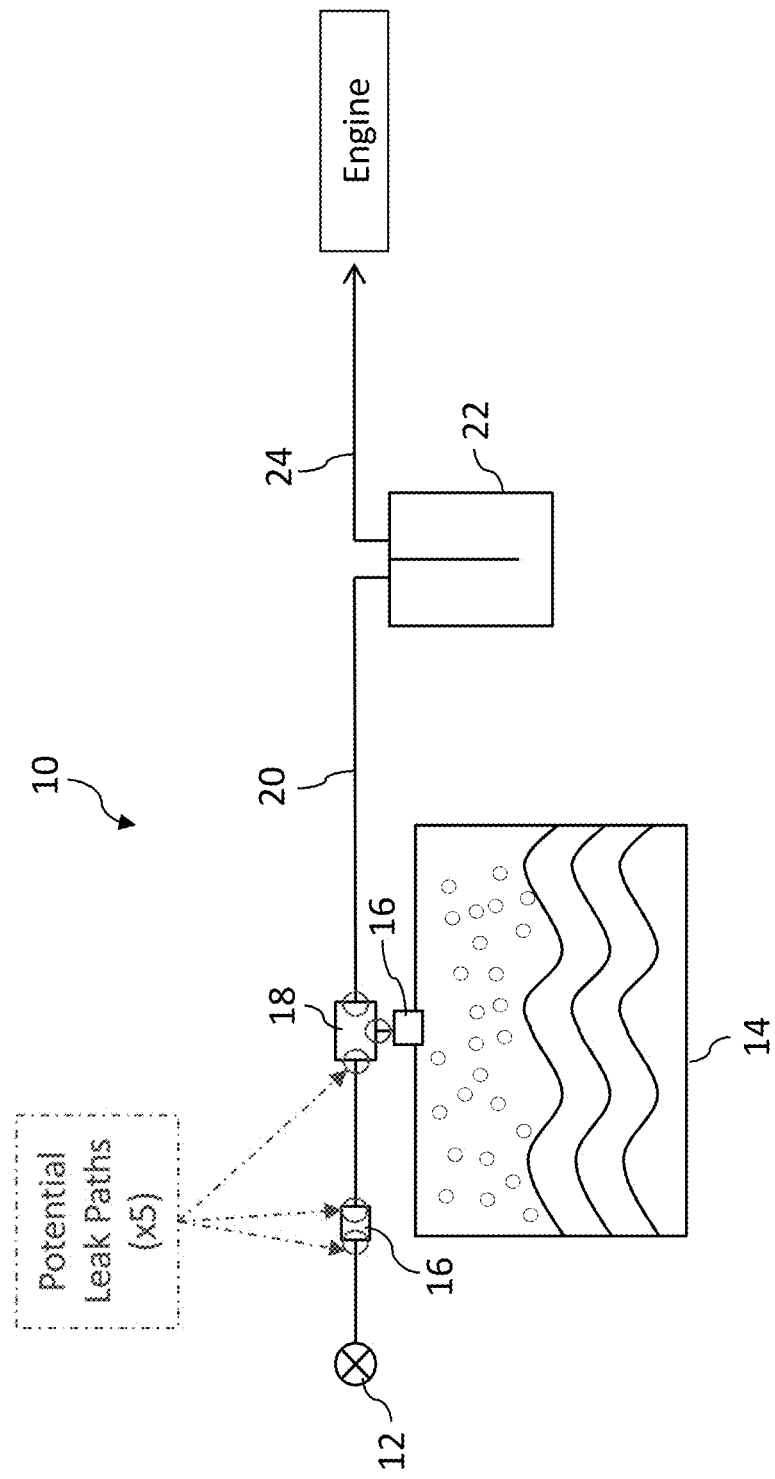
FIG. 1 is a fuel filler and vapor purge system engine schematic illustration of a prior art system.

The following detailed description will illustrate the general principles of the invention, examples of which are additionally illustrated in the accompanying drawings. In the drawings, like reference numbers indicate identical or functionally similar elements.

As used herein, "fluid" means any liquid, suspension, colloid, gas, plasma, or combinations thereof.

Figure 2:
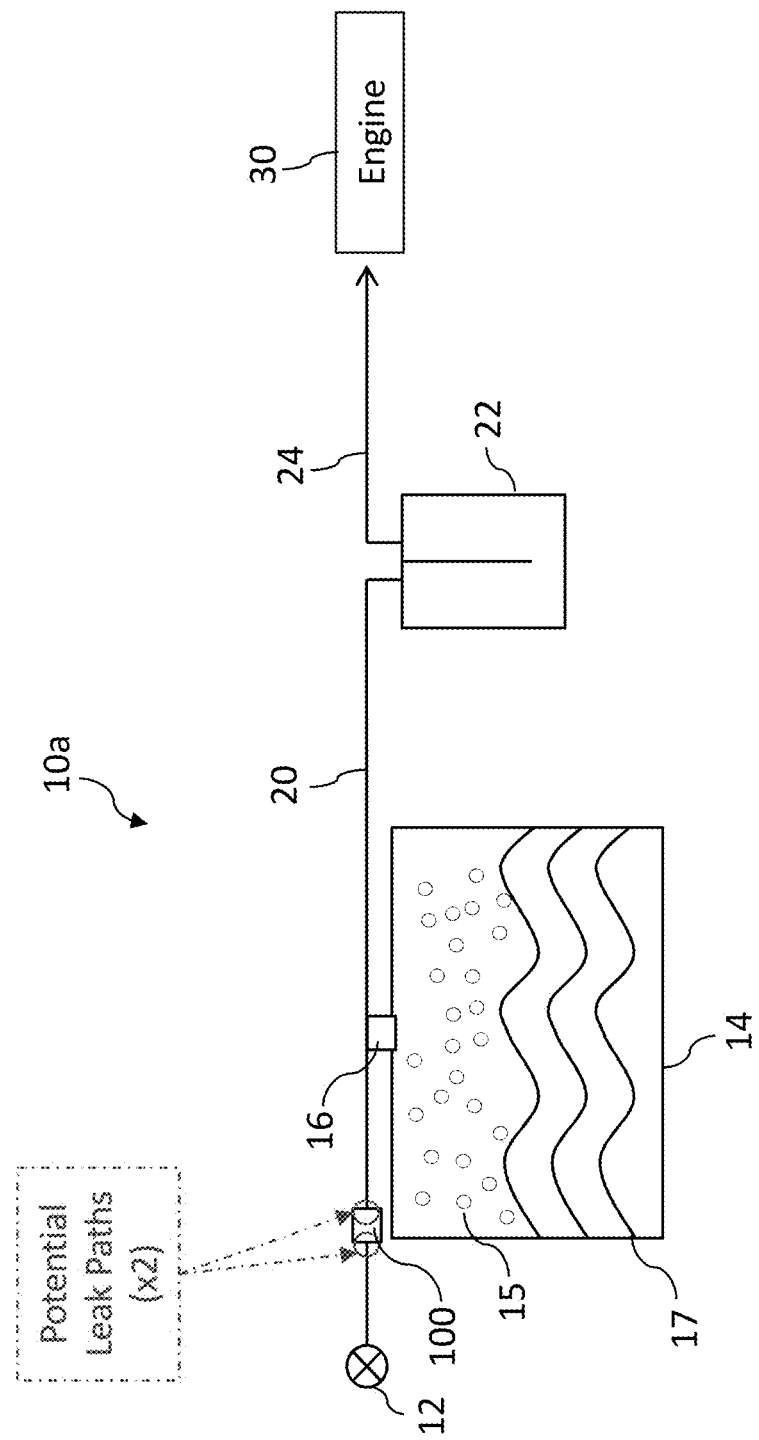
FIG. 2 is a fuel filler and vapor purge system engine schematic illustration having the quick connector with a replaceable restriction orifice.

FIG. 2 illustrates one embodiment of an engine system 10a, which may be a vehicle engine system, which includes a quick connector 100 having a female quick coupling 102, 102a, or 102b having a replaceable restriction orifice according to any of the embodiments disclosed herein. The engine system 100 is configured for combusting fuel vapor 15 from a fuel tank 14 which accumulates in at least one component thereof and includes a multi-cylinder internal combustion engine 30. The fuel tank 14 holds fuel 17 to be supplied to the internal combustion engine 30 and is operatively connected to an evaporative emissions control system having a purge canister 22 adapted to collect fuel vapor emitted by the fuel tank 14 and to subsequently release the fuel vapor to the engine 30 through the purge line 24. In contrast to the prior art system of FIG. 1, between the fuel filler inlet 12 and the fuel tank 14 there is one standard quick connector 16 and one quick connector having a replaceable restriction orifice 100, thereby reducing the potential number of leak paths from five to two. The quick connector 100 connects the fuel filler inlet 12 to the conduit leading to the fuel tank and to the fuel fill conduit 20.

The engine system may be an onboard refueling vapor recovery (ORVR) system, a pressure integrity check system, or a make-up air system. The quick connect however is not limited thereto and can be useful in any system requiring a restriction to flow of fluid therethrough.

Figure 3:
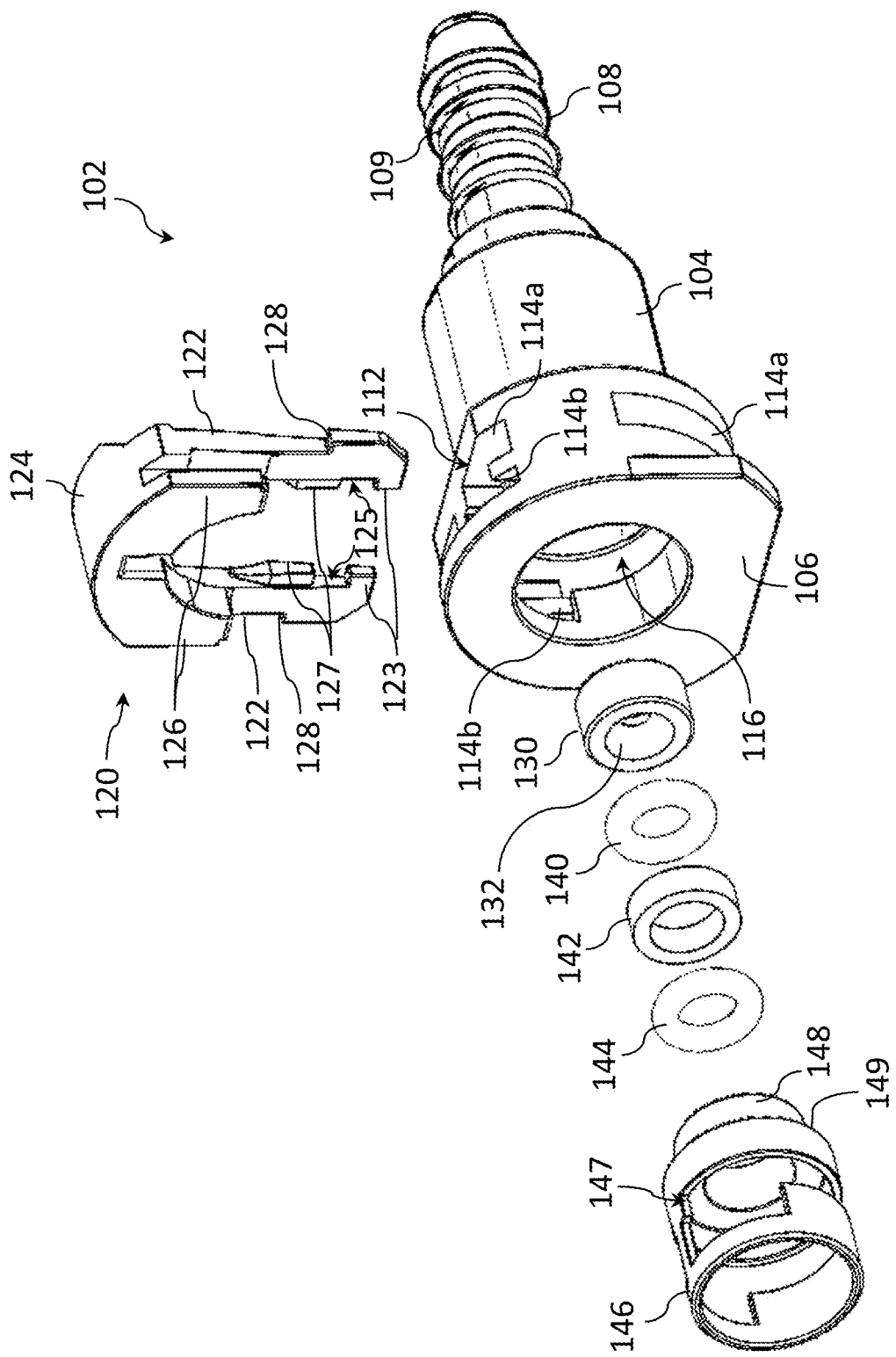
FIG. 3 is an exploded view of one embodiment of a female quick coupling with a replaceable restriction orifice.

Referring now to FIGS. 3-5, the female quick coupling 102 has an elongate tubular housing 104 having an input end 106 shaped to receive a male coupling (not shown) having an exterior annular bead, wherein the male and female couplings form a quick connector, and a stem 108 defining the opposing end. The stem 106 may include a retaining feature 109, such as a plurality of annular protruding ribs shown in FIG. 3 for receiving a hose or conduit securely thereover. The housing 104 defines an axial bore 116 having a dual stepped bore defining a first shoulder 118 (FIG. 2) and a second shoulder 119 therein and, proximate the input end 104, has a connector collar 110 defining a first slot 112 oriented transverse to the axial bore 116.

The first slot 112 has a plurality of arm sockets 114. Arm sockets 114a extends through the housing 104 and are both open at both ends, and arm sockets 114b extend into and terminate within the housing 104.

Figure 6:
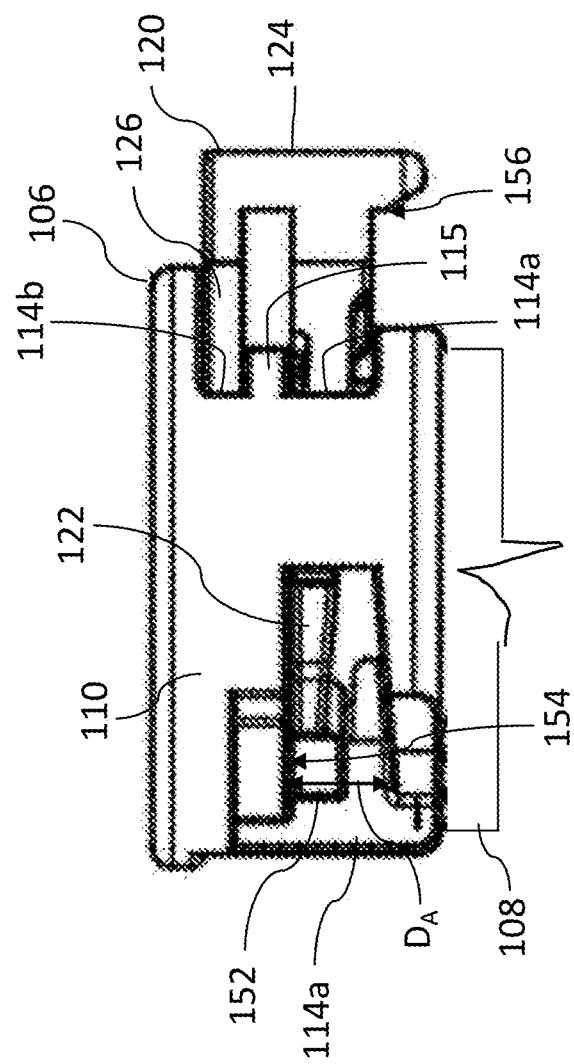
FIG. 6 is a side view of the collar connector of the embodiment of FIG. 3 with the locking member in a starting position.

A locking member 120 cooperates with the housing 104 to fasten a male quick coupling within the connector collar 110, in particular the locking member is slidingly receivable in the first slot 112 until it locks therein using a set of elongate arms 122. The locking member 120 has a cover portion 124 from which the set of elongate arms 122 protrude and from which a set of shorter holding arms 126 protrude. In FIG. 3, the locking member 120 is in an unassembled position. In FIG. 6, the locking member 120 is in its assembled retracted, starting position, in which it is inserted into the slot 112 until the notches 128 on the radial exterior sides of the elongate arms 122 latch into the housing 104. FIG. 4 shows the locking member 120 in the locking position in which it is fully inserted into the slot 112 and the cover portion 124 forms a portion of the exterior surface of the collar portion 110.

Returning to FIGS. 3-5, the housing 104 has seated within the axial bore a removable insert 130 defining a restriction orifice 132, which is seated against the first shoulder 118. And, seated upon the removable insert 130, moving in order in the upstream direction is a first sealing member 140, a spacer 142, a second sealing member 144, and a lock washer 146. The sealing members may be O-rings, X-rings, and V-rings, but are not limited thereto. The lock washer 146 has a structure that defines a void 147 that matches the slot's configuration at the interior diameter of the axial bore 116 within the collar connector 110. The lock washer 146 may have a snap-fit within the axial bore or may be press fit within the axial bore with an interference fit or other known secure fits. The lock washer 146 is a removable member during the manufacturers testing, but is permanent once a restriction orifice 132 size has been determined for the female quick coupling 102. The downstream end of the lock washer defines a neck 148 and a shoulder 149. The shoulder 149 seats against the second shoulder 118 of the axial bore 116 as shown in FIG. 4.

Turning now to FIG. 4, the removable insert 130 defining the restriction orifice 132 may have any size orifice opening required for a preselected application. The female quick coupling 102 can be part of a kit that has a plurality of removable inserts 130 that each define an orifice opening 134 of a different size and/or differently angled frustums terminating at the orifice opening 134. In the embodiment of FIG. 4, the removable insert 130 defines a restriction orifice 134 having an upstream conical frustum 136 and a downstream conical frustum 138 mated at their respective smallest diameters at the orifice opening 134. The upstream conical frustum 136 has a largest diameter substantially similar to an internal diameter of the first sealing member 140 and the downstream conical frustum 138 has a largest diameter substantially similar to an internal diameter of the axial bore 116 extending downstream of the first shoulder 118. In one embodiment, the largest dimeter of the upstream conical frustum 136 is larger than the largest diameter of the downstream conical frustum 138. In another embodiment, the upstream conical frustum 136 and the downstream conical frustum 138 are shaped according to a hyperbolic function.

Turning now to FIG. 5, an alternate embodiment for the removable insert 130' is shown. Here, the removable insert 130' defines a frustoconically-shaped bore 133 defining the restriction orifice 134', wherein the removable insert 130' is seatable against the first shoulder 118 of the axial bore 116 with either of a first end face 139a defining the opening of the frustoconically-shaped bore is seated against the first shoulder or a second end face 139b defining the restriction orifice. The restriction orifice 134 is commonly circular, though can be created in any shape that creates appropriate restriction at a given specification. Upstream and downstream bore shapes 136 or 138 are not limited to frustoconical, and can be cylindrical or any other shape to meet the desired restriction orifice 134 size, 136 and 138 do not have to originate at a diameter substantially similar to the internal diameter of the axial bore 116 as long as the desired restriction is met.

Turning to FIGS. 4 and 6, the set of elongate arms 122 are engaged in the sockets 114a in the locked position by a locking feature 152 (only shown in FIG. 6) that is receivable in the gap 125 defined between the feet 123 of each elongate arm 122 and the radially inward protruding locking tabs 127 of each elongate arm. The slot 112 includes a set of spacers 115 facing one another from opposite faces of the slot, which separate socket 114a from 114b in each pair of sockets. As such, when the locking member 120 is inserted into the slot 112, the spacer 115 separates each elongate arm 122 from its respective holding arm 126. The locking feature 152 of each socket 114a is formed protruding in a surface 154 of the socket 112 that is most proximate the input end 106. When the foot 123 of each elongate arm 122 is inserted fully in the slot 114a, the gap 125 receives the locking feature 152 and each foot prevents the locking member from being removable from the slot 112.

Turning to FIG. 6, each socket 114a is axially larger (see the axial distance $(D_A)$) than a thickness of the corresponding elongate arm 122, in particular in the axial direction toward the stem 108. Each elongate arm 122 is elastically flexible in the axial direction toward the stem 108. As such, from the locked position, the elongate arms 122 may be biased toward the stem 108 a clearance distance away from the locking feature 152 enabling the locking member 120 to be returned to the retracted, starting position shown in FIG. 6. The biasing force may be applied in the downstream direction at the foot 123 of each elongate arm 122, which protrude from the collar connector 110 in the locked position, or in the upstream direction against the underside 156 of the cover portion 124.

Figure 7:
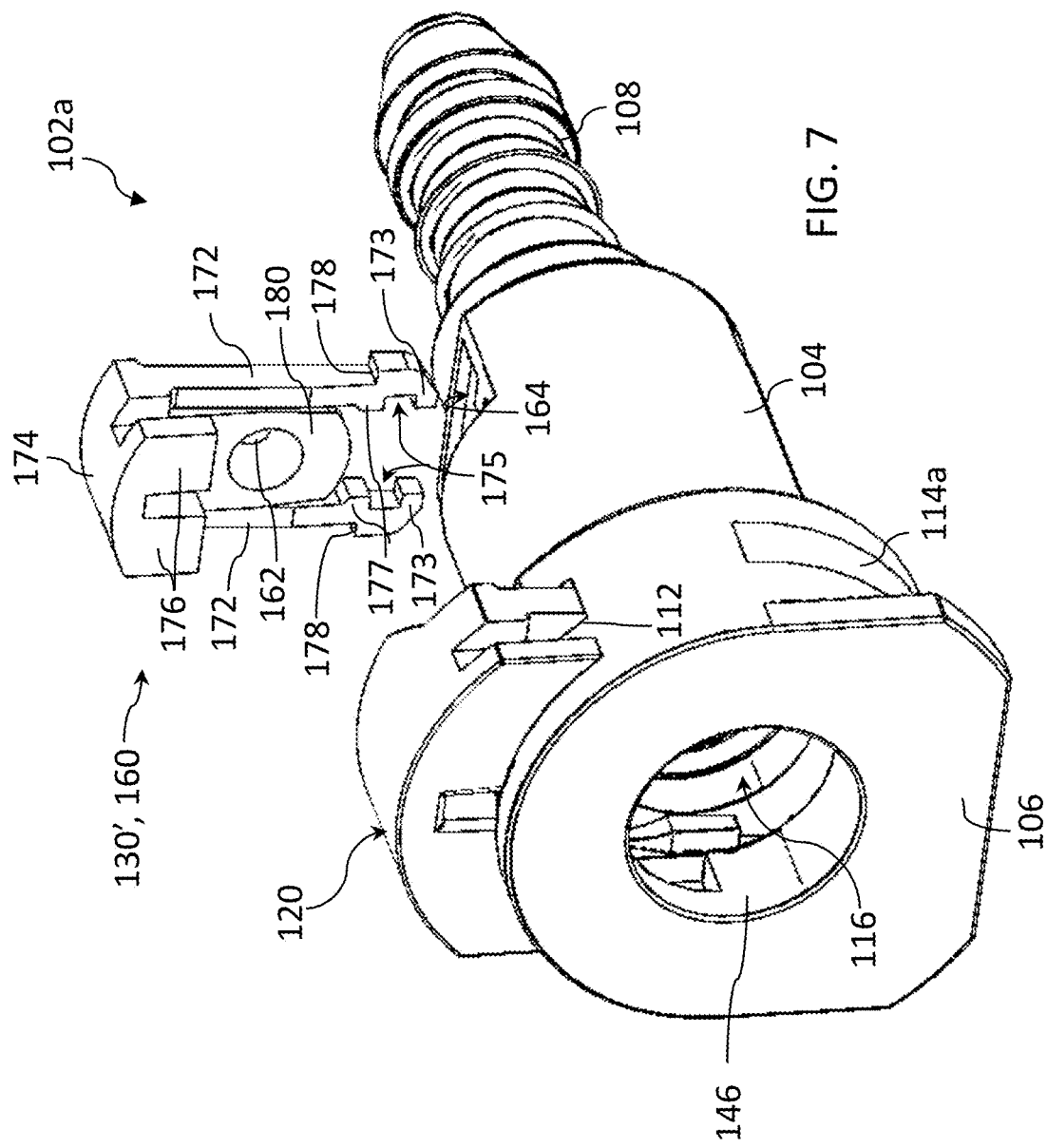
FIG. 7 is a second embodiment of a female quick coupling with a replaceable restriction orifice.

Referring now to FIG. 7, a second embodiment for a female quick coupling 102a has a removable insert 130' defining a restriction orifice that is a latchable plug 160 defining a restriction orifice 162. The slot 112, locking member 120, first sealing member 140, spacer 142, second sealing member 144, and lock washer 146 are the same as those for the first embodiment of FIGS. 1-5. Here, the latchable plug 160 is slidingly receivable in a second slot 164 defined by the housing 104, which is oriented transverse to the axial bore 116 and is positioned proximate the first shoulder 118, such that the removable insert 160, when in a latched position, aligns the restriction orifice with the axial bore and seats the downstream face of the body 180 against the first shoulder 118.

Similar to the locking member 120, the latchable plug 160 has a cover portion 174 from which a set of elongate arms 172 protrude and from which a set of shorter holding arms 176 protrude. In addition, a body 180 protrudes from the cover portion 174 at a position between the set of elongate arms 172. The body 180 defines the restriction orifice 162. The body 180 may have any of the frustoconical shaped bores or mating frustum shaped bores described above. The set of elongate arms 122 each define a gap 175 between a foot 172 thereof and a radially inward protruding tab 177 thereof for locking to a locking feature of the slot 164 in the same manner described above for the locking member 120 and the first slot 112. The body 180 does not extend beyond the protruding tabs 177, so as not to interfere with the mating thereof with the locking feature of the second slot 164. The second slot 164 is generally the same at the first slot, but of smaller dimensions.

In FIG. 7, the latchable plug 160 is in an unassembled position, but it has an assembled retracted, starting position, in which it is inserted into the slot 164 until the notches 178 on the radial exterior sides of the elongate arms 174 latch into the housing 104 and a locking position in which it is fully inserted into the slot 164 in the same manner as the locking member 120.

The female quick coupling 102a can be part of a kit that has a plurality of removable inserts 130' that each define an orifice opening 162 of a different size and/or differently angled frustums terminating at the orifice opening 162. The removable inserts 130' are able to be removed and replaced with one having a different size restriction orifice during testing in the event the female quick coupling does not meet a customer's pre-selected system requirements.

Figure 8:
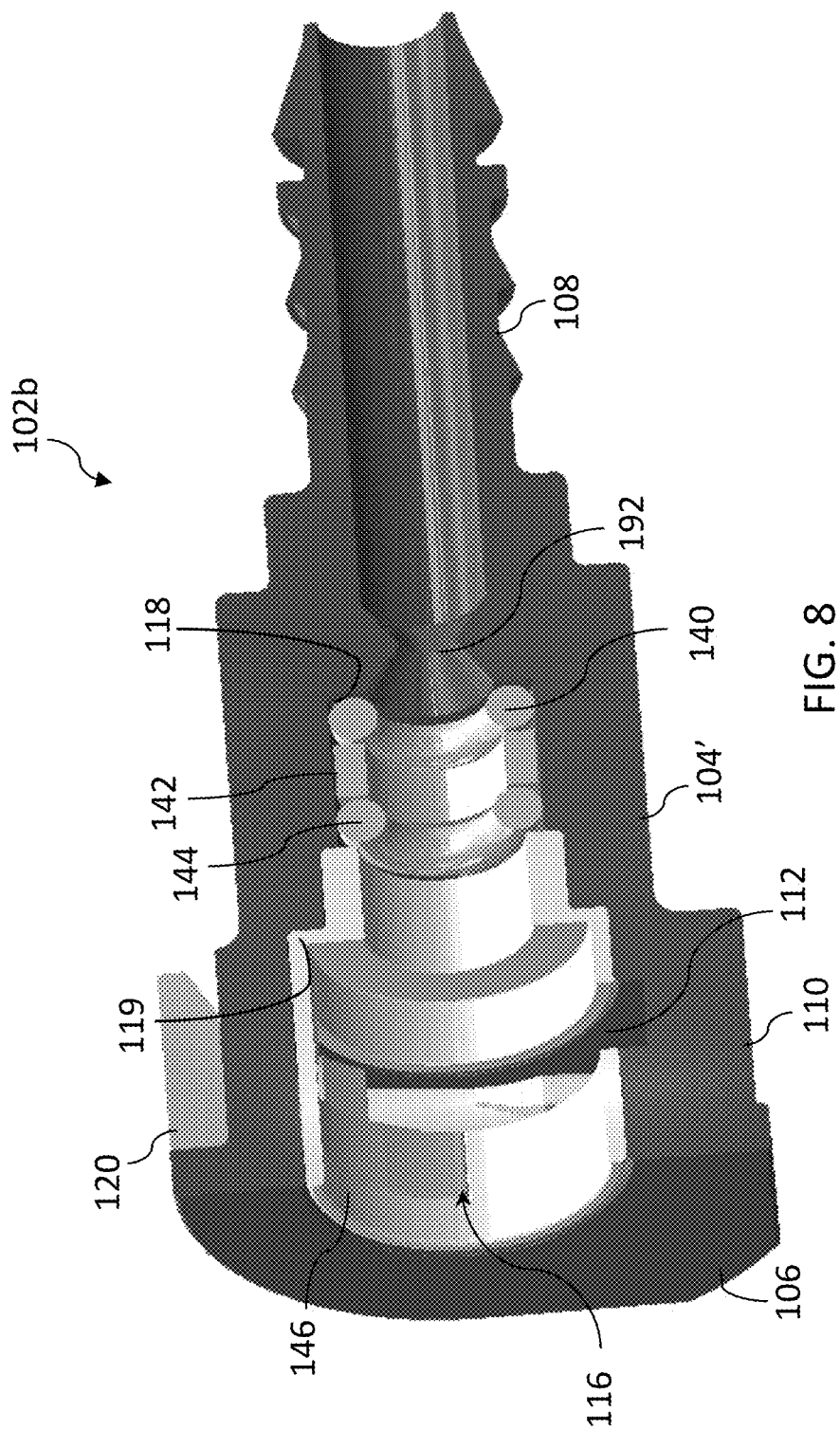
FIG. 8 is a third embodiment of a female quick coupling where the housing includes a restriction orifice as a molded portion of the bore thereof.

Turning now to FIG. 8, a third embodiment for a female quick coupling 102b has a molded housing 104' that defines a restriction orifice 192. The slot 112, locking member 120, first sealing member 140, spacer 142, second sealing member 144, and lock washer 146 are the same as those for the first embodiment of FIGS. 1-5. Here, the restriction orifice 192 is integrally molded with the housing 104'. The restriction orifice 192 is positioned at and immediately downstream, of the first shoulder 118. The first sealing member 140 is seated against the first shoulder 118. The housing 104' may have any of the frustoconical shaped bores or mating frustum shaped bores described above.

The female quick coupling 102b can be part of a kit that has a plurality of housings 104' that each define an orifice opening 192 of a different size and/or differently angled frustums terminating at the orifice opening 162. The housing 104' is able to be removed and replaced with one having a different size restriction orifice during testing in the event the female quick coupling does not meet a customer's pre-selected system requirements.

Advantages and/or benefits of the quick connector with a replaceable or tunable restriction orifice include the integration of the restriction orifice into the quick connector for smaller packaging and a reduction of components. But even more importantly, the quick connector disclosed herein provides an easy means to change the orifice dimensions during manufacturing and, more specifically, during testing. The replaceable orifice is easily changed during testing without vehicle tear up or waiting for a new part to be manufactured, which is considered a late stage engineering change that can cause significant delay.

It should be noted that the embodiments are not limited in their application or use to the details of construction and arrangement of parts and steps illustrated in the drawings and description. Features of the illustrative embodiments, constructions, and variants may be implemented or incorporated in other embodiments, constructions, variants, and modifications, and may be practiced or carried out in various ways. Furthermore, unless otherwise indicated, the terms and expressions employed herein have been chosen for the purpose of describing the illustrative embodiments of the present invention for the convenience of the reader and are not for the purpose of limiting the invention.

Having described the invention in detail and by reference to preferred embodiments thereof, it will be apparent that modifications and variations are possible without departing from the scope of the invention which is defined in the appended claims.

What is claimed is:

1. A female quick coupling comprising:
a housing defining an axial bore therethrough that has a frustum-shaped bore portion that has an upstream conical frustum and a downstream frustum mated at their respective smaller diameters to define a restriction orifice, a first slot transverse to the axial bore, and a first shoulder between the first slot and the restriction orifice;
a spacer seated against the first shoulder within the axial bore; and
a locking member slidingly received in the first slot, thereby locking the spacer in the axial bore.

2. The female quick coupling of claim 1, comprising a sealing member and a lock washer seated on the spacer.

3. The female quick coupling of claim 2, wherein the axial bore has a dual stepped bore defining the first shoulder and a second shoulder, wherein the lock washer is seated against the second shoulder.

4. The female quick coupling of claim 1, wherein the upstream conical frustum has a largest diameter substantially similar to an internal diameter of the first sealing member and the downstream conical frustum has a largest diameter substantially similar to an internal diameter of the axial bore extending downstream of the first shoulder.

5. The female quick coupling of claim 4, wherein the largest diameter of the upstream conical frustum is larger than the largest diameter of the downstream conical frustum.

6. The female quick coupling of claim 5, wherein the upstream conical frustum and the downstream conical frustum are shaped according to a hyperbolic function.

7. A fuel vapor purge system comprising:
a fuel tank in fluid communication with a fuel filler inlet, a purge canister and an internal combustion engine; and
a female quick coupling of claim 1 in the fuel line between the fuel filler inlet and the fuel tank.

8. The system of claim 7, comprising a purge cannister in fluid communication with the fuel tank.

9. The female quick coupling of claim 1, wherein the frustum-shaped bore portion is integral with the housing.

10. The female quick coupling of claim 7, wherein the frustum-shaped bore portion is integral with the housing.

11. A female quick coupling kit comprising:
a plurality of housings each defining an axial bore therethrough that has a frustum-shaped bore portion that defines a restriction orifice, a first slot transverse to the axial bore, and a first shoulder between the first slot and the restriction orifice, wherein each restriction orifice is of a different dimension relative to one another, and a first of the plurality of housings has a frustum shaped port portion that has an upstream conical frustum and a downstream frustum mated at their respective smaller diameters to define the restriction orifice thereof;
a spacer seatable in the axial bore of any of the plurality of housings against the first shoulder;
a sealing member seatable in the axial bore of any of the plurality of housings; and
a locking member slidingly receivable in the latching slot to lock a male fluid line in the axial bore of any of the housings.

12. The female quick coupling kit of claim 11, comprising, in order, seated upon the first shoulder, a first sealing member, a spacer, a second sealing member, and a lock washer; wherein the axial bore has a dual stepped bore defining the first shoulder and a second shoulder, and the lock washer is seated against the second shoulder.

13. The female quick coupling of claim 11, wherein the first of the plurality of housings has a frustum shaped port portion that is integral with the housing.

* * * * *